Figure 1:
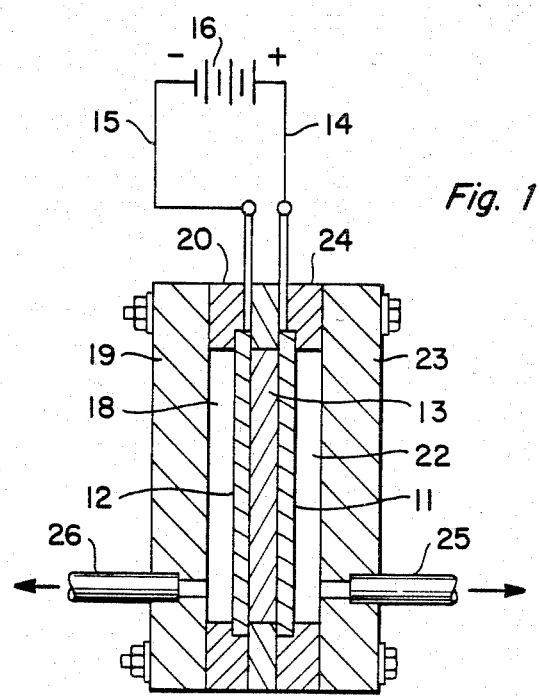

United States Patent [19]

LaConti et al.

[11] Patent Number: 4,528,083

[45] Date of Patent: Jul. 9, 1985

[54] DEVICE FOR EVOLUTION OF OXYGEN WITH TERNARY ELECTROCATALYSTS CONTAINING VALVE METALS

[75] Inventors: Anthony B. LaConti, Lynnfield; John F. Enos, Peabody; Russell M. Dempsey, Hamilton; Anthony R. Fragala, N. Andover, all of Mass.

[73] Assignee: United Technologies Corporation, Hartford, Conn.

[21] Appl. No.: 592,662

[22] Filed: Mar. 23, 1984

Related U.S. Application Data

[63] Continuation of Ser. No. 485,157, Apr. 15, 1983, abandoned.

[51] Int. Cl.³ .................. C25B 9/00; C25B 11/06; C25B 11/08
[52] U.S. Cl. .................. 204/265; 204/266; 204/290 R; 204/290 F; 204/291; 204/292; 204/293
[58] Field of Search ............ 204/129, 263, 265–266, 204/290 R, 290 F, 291–293

[56] References Cited

U.S. PATENT DOCUMENTS

| | | | |
|---|---|---|---|
| 3,632,498 | 1/1972 | Beer | 204/290 F |
| 4,039,409 | 8/1977 | LaConti et al. | 204/129 |
| 4,147,600 | 4/1979 | Rutherford et al. | 204/98 |
| 4,191,618 | 3/1980 | Coker et al. | 204/98 |

OTHER PUBLICATIONS

"Modern Chlor–Alkali Tech.", vol. 2, C. Jackson, (Editor), Ellis Horwood Ltd., 1983, pp. 101–102.

Primary Examiner—R. L. Andrews
Attorney, Agent, or Firm—I. David Blumenfeld; Alan C. Cohen

[57] ABSTRACT

A gas generating apparatus and method is described which utilizes a novel catalytic oxygen evolving electrode for such electrochemical systems as electrolysis cells and oxygen concentration cells. The electrochemical cells include a catalytic cathode and an improved catalytic anode positioned on opposite sides of, and in electrical contact with, a cation exchange membrane. A source of direct current potential between the cathode and the anode and means for removing gas from at least one of the electrodes are provided. The improved catalytic anode is a ternary platinum group reduced metal oxide alone or in combination with platinum group metals and/or platinum group metal oxides or mixtures of the foregoing having at least one valve metal component such as titanium, hafnium, zirconium, niobium, tantalum, and tungsten.

2 Claims, 2 Drawing Figures

DEVICE FOR EVOLUTION OF OXYGEN WITH TERNARY ELECTROCATALYSTS CONTAINING VALVE METALS

This application is a continuation of application Ser. No. 485,157, filed 4/15/83, now abandoned.

This invention relates to apparatus and methods for the generation and concentration of gases, and more particularly, it relates to an apparatus and process for the generation and concentration of oxygen by electrolysis using catalytic cathodes and improved catalytic anodes.

Electrochemical cells of the type utilizing an ion exchange membrane, otherwise known as and designated herein as a solid polymer electrolyte membrane, associated with a pair of catalytic electrodes have been described in the prior art in various forms and applications. In one form, such electrochemical cells may be utilized to generate electrical energy and are commonly known as fuel cells. In another form, such electrochemical cells have been used in gas sensing and dosimeter devices and processes. In still other forms, such electrochemical cells have been utilized for gas generation utilizing special electrocatalysts.

Various metals and alloys are utilized as the catalytic electrodes for such fuel cells, for gas sensing and dosimeter cells and other cells such as those used for gas generation and gas concentrating. The performance of the catalyst at the gas evolving electrode (anode) or at the gas concentrating electrode (anode) is crucial in the effectiveness and efficiency of the cell and consequently, it is crucial in the economics of the process. Such catalysts as platinum, platinum black and platinum-alloys and mixtures thereof have been used in the past as catalysts for these cells.

Electrochemical cells and methods for gas generation utilizing specific catalysts and electrodes are well-known in the prior art. In U.S. Pat. No. 3,992,271, an electrolysis and oxygen concentrating cell utilizing an oxygen evolving catalytic anode is described. The oxygen evolving catalytic anode utilizes a reduced platinum-iridium oxide alloy and provides improved performance and efficiency even though the use of such reduced platinum-iridium oxide alloys as oxygen electrodes in fuel cells had always resulted in poorer performance of the cell. However, the iridium, as well as the platinum, utilized as the alloying metals in the catalyst of U.S. Pat. No. 3,992,271 is quite expensive, and it was discovered in U.S. Pat. No. 4,039,409 that a reduced alloy oxide of platinum and ruthenium containing about 5 to 60% ruthenium, had better performance than the reduced platinum-iridium oxide alloy catalyst, and it was much less expensive to produce since the cost of ruthenium salts utilized to fabricate the platinum-ruthenium alloy was approximately half the cost of the iridium salts. Thus, in U.S. Pat. No. 4,039,409, there was provided a catalytic cathode and a gas evolving catalytic anode containing a reduced platinum-ruthenium alloy oxide containing 5 to 60% by weight of ruthenium positioned on opposite faces of a cation exchange membrane.

Although the prior art gas generating and concentrating devices and processes work efficiently, it is always desirable to improve the efficiency of the devices and processes and at the same time reduce the cost of the devices and processes. Furthermore, it is always desirable to improve the resistance of the materials used in the electrochemical cells to the corrosion effects of chemicals. Since these electrochemical gas generating and gas concentrating devices utilize and/or generate acid media, there is a tendency of these acids (hydrogen ions or protons and other acid media) to corrode the catalysts, especially the catalysts used at the anode and thereby reduce the life of the device.

Stabilized electrocatalysts have been used as electrodes in processes and devices for the generation of chlorine by electrolysis of an aqueous alkali metal halide at the anode of an electrolysis cell which includes a solid polymer electrolyte in the form of a cation exchange membrane to separate the cell into catholyte and anolyte chambers. The catalytic electrodes at which the chlorine and caustic are produced are thin, porous, gas permeable catalytic electrodes which are bonded to and embedded in opposite surfaces of the membrane so that the chlorine is generated at the electrode membrane interface. This results in electrodes which have very low overvoltages for chlorine discharge and the production of caustic. The catalytic electrodes recommended for this electrolysis cell for the production of chlorine include a catalytic material comprising at least one reduced platinum group metal oxide which is thermally stabilized by heating reduced oxides in the presence of oxygen, and in a preferred embodiment, the electrodes are fluorocarbon bonded with thermally stabilized reduced oxides of a platinum group metal such as platinum, palladium, iridium, rhodium, ruthenium, and osmium. In the electrolysis cell for the production of chlorine, it was also discovered that one or more reduced oxides of a valve metal such as titanium, tantalum, niobium, zirconium, hafnium, vanadium, or tungsten could be added to stabilize the electrode against oxygen, chlorine and the generally harsh electrolysis conditions. The foregoing disclosure relates only to an electrochemical cell for the production of chlorine from a medium such as aqueous sodium chloride.

The choice of catalyst in an electrochemical cell and its effectiveness in a given cell, depends upon a complex set of variables such as the surface area of a catalyst, availability of oxides of its species on the catalyst surface, contaminants in the reactant, and the nature of the conversion taking place in the cell. Consequently, it is and always has been difficult to predict the applicability of a catalyst useful in one electrochemical cell system to a different system. Even though one type of catalyst may produce advantageous results in one type of electrochemical cell system, it does not always follow that such an improvement will be realized when the same catalyst is utilized in a different electrochemical cell system. As explained above, it is always desirable not only to improve the stability of the catalysts and other elements of the electrochemical cells, it is always desirable to improve the efficiencies of the electrochemical cells and the processes carried out therein.

It is, therefore, the primary object of the present invention to provide an improved method and apparatus for gas generation utilizing an improved electrocatalyst at the gas evolving electrode.

It is a further object of the present invention to provide an improved gas generation apparatus and process with which to concentrate gases or produce gases by electrolysis which utilizes a catalyst which provides improved performance, improved stability and reduced cost.

Another object of this invention is to provide a method and apparatus for producing oxygen by the electrolysis of media which evolve oxygen and protons by electrolysis, with substantially lower and improved cell voltages.

Still another object of the present invention is to provide an improved gas generation apparatus and a process for concentrating oxygen or producing oxygen by electrolysis utilizing an improved, stable catalyst at the oxygen evolving anode.

Other objects and advantages of the invention will become apparent from the following description.

In accordance with the invention, oxygen is electrolytically generated by the steps comprising, providing a catalytic cathode; providing a catalytic oxygen evolving anode; positioning a cation exchange membrane between, and in electrical contact with, the cathode and the anode; providing a direct potential between the cathode and the anode and supplying water to one of the electrodes to be acted on electrochemically to evolve oxygen at the anode, wherein the improvement comprises the step of providing a catalyst at the oxygen evolving anode consisting of at least two platinum group metal-containing compounds and at least one valve metal-containing compound. In another aspect of the invention, there is provided an apparatus for the production of oxygen by the electrolysis of a medium which evolves oxygen and protons by electrolysis, comprising, a catalytic cathode; a catalytic oxygen evolving anode comprising a catalyst consisting of at least two platinum group metal-containing compounds and at least one valve metal-containing compound; an ion exchange membrane (solid polymer electrolyte membrane) disposed between and in electrical contact with, the cathode and the anode; means for providing a direct potential between the cathode and the anode; and means for supplying a medium which evolves oxygen and protons by electrolysis.

In another aspect of the invention, there is provided a process for the production of oxygen by the electrolysis of media which evolve oxygen and protons by electrolysis, comprising;

(a) continuously supplying the medium which evolves oxygen and protons, to a catalytic oxygen evolving anode in an electrolytic cell wherein the catalytic oxygen evolving anode is separated from a catalytic cathode by a cation exchange membrane, and the catalytic oxygen evolving anode and the catalytic cathode are in electrical contact with the cation exchange membrane, the catalytic oxygen evolving anode comprising a catalyst consisting of at least two platinum group metal-containing compounds and at least one valve metal-containing compound;

(b) continuously providing an aqueous medium to the catalytic cathode;

(c) supplying current to the anode and the cathode to electrolyze the medium which evolves oxygen and protons at the anode; and, (d) removing oxygen from the anode and gas formed from the protons from the cathode.

In another aspect of the invention, there is provided a method for electrolytically generating oxygen from oxygen contained in a gaseous stream by concentrating the oxygen at the anode, comprising the steps of:

(a) providing a catalytic cathode;
(b) providing a catalytic anode;
(c) positioning an ion exchange membrane between, and in electrical contact with, the cathode and the anode;
(d) providing a direct current potential between the cathode and the anode;
(e) providing a gaseous stream including oxygen at the cathode; and,
(f) supplying water to one of the electrodes to be acted on electrochemically;

the improvement comprising providing a catalyst at the oxygen concentrating anode consisting of at least two platinum group metal-containing compounds and at least one valve metal-containing compound.

Critical in the process and apparatus of the present invention is the use of a catalyst at the catalytic anode wherein the catalyst consists of at least two platinum group metal-containing compounds and at least one valve metal-containing compound. As used herein, the valve metals are titanium, tantalum, niobium, zirconium, hafnium, vanadium and tungsten. The platinum group metals are platinum, palladium, rhodium, ruthenium, osmium, and iridium. In this invention, "metal-containing compounds" is defined as the metal oxides, the reduced metal oxides, the metals and mixtures and/or alloys thereof.

Figure 2:
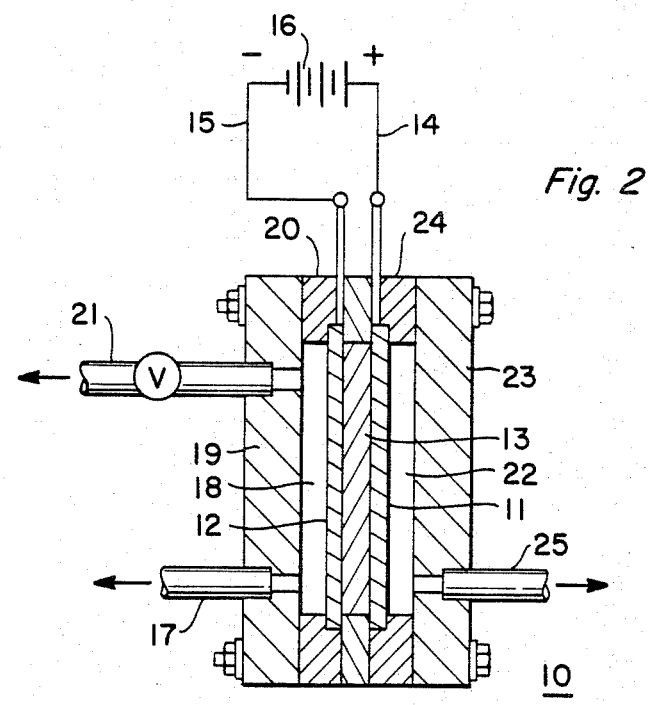

These and various other objects, features and advantages of the invention can be best understood from the following description taken in connection with the accompanying drawings in which:

FIG. 1 is a sectional view of a gas generation apparatus for the production of gases, such as oxygen and hydrogen, by electrolysis which is capable of carrying out the process of the invention and which is constructed with the catalytic anode of the present invention; and, FIG. 2 is a sectional view of a gas generating apparatus of the gas concentrator type or air depolarizer electrolyzer having a catalytic anode made in accordance with the invention and capable of carrying out the process of the invention.

The devices illustrated in FIGS. 1 and 2 are used to illustrate the catalytic anodes of the present invention and are clearly described in U.S. Pat. No. 4,039,409.

In FIG. 1 of the drawings, there is shown a gas generation apparatus in the form of an electrolysis cell. In this cell, oxygen anode chamber 22 (anolyte chamber) communicates with oxygen outlet 25 while hydrogen cathode chamber 18 (catholyte chamber) communicates with hydrogen outlet 26. In the operation of the electrolysis cell of FIG. 1, a direct current potential is applied across catalytic anode 11 and catalytic cathode 12 from batteries 16 while a hydrogen-containing compound or a medium which evolves oxygen and protons, such as water, aqueous sulfuric acid, aqueous sodium sulfate, and the like, is supplied at the catalytic anode. The direct current applied across catalytic anode 11 and catalytic cathode 12 dissociates the medium at the anode to produce oxygen and protons (hydrogen ions). The hydrogen accumulates in catholyte chamber 18 and is removed through outlet 26 while oxygen accumulates in anolyte chamber 22 and is removed through outlet 25.

In the electrolysis cell of FIG. 1, no gases are supplied to the apparatus but a direct current potential is applied across the improved catalytic anode of the present invention to the catalytic cathode from the battery, and a hydrogen-containing or proton-containing compound such as water, for example, is supplied at the improved catalytic anode. The catalytic anode is a catalyst consisting of at least two platinum group metal-containing compounds and at least one valve metal-containing compound. Dissociation of the hydrogen-containing or proton-containing compound at the catalytic anode results in molecular hydrogen gas (H$_2$) being produced at the catalytic cathode while oxygen gas is produced at the improved catalytic anode. With a cation exchange membrane, the reactions at the electrodes are as follows:

At the improved catalytic anode:

$$H_2O \rightarrow \tfrac{1}{2}O_2 + 2H^+ + 2e^-$$

At the catalytic cathode:

$$2H^+ + 2e^- \rightarrow H_2$$

In the electrolysis cell described above, the medium which evolves oxygen and protons, that is the hydrogen-containing or proton-containing compounds which also contain oxygen, for example, water, required to produce hydrogen ions (protons) and oxygen, for example, by dissociation at the improved catalytic anode, is supplied through the catalytic anode by flooding the anode chamber (anolyte chamber) or through the use of wicking. This mode of supply of water or other media which evolve oxygen and protons, or oxygen and hydrogen ions, is preferable to a cathode water feed.

Briefly, in FIG. 2, there is shown generally at 10 a gas generation apparatus in the form of an oxygen concentrator embodying the invention and capable of carrying out the process of the invention. The same numbers have been used to show similar parts in FIGS. 1 and 2. Apparatus 10 is shown with a catalytic anode 11 which consists of at least two platinum group metal-containing compounds and at least one valve metal-containing compound, a catalytic cathode 12 and an ion exchange membrane or solid polymer electrolyte membrane 13 positioned or interposed between, and in electrical contact with anode 11 and cathode 12. Electrical leads 14 and 15 are connected to electrodes 11 and 12 and to an external power source 16 shown in the form of a battery connected across the electrodes.

An oxidant, such as air or impure oxygen, is supplied to cathode 12 through an inlet conduit 17 and chamber 18 (the catholyte chamber) formed by endplate 19, gasket 20 and cathode 12. A valved outlet 21 is provided for exhaust impurities from cathode chamber 18. An output gas chamber 22 (anode chamber) is formed by anode 11, endplate 23 and gasket 24. The concentrated oxygen provided to anode chamber 22 is supplied to a suitable outlet conduit 25 for consumption or storage.

The gas concentrator shown in FIG. 2 operates by supplying the gas (air or impure oxygen, both of which are free of carbon monoxide or carbon fuel contaminants) through inlet 17 and cathode chamber 18 to catalytic cathode 12. A direct current potential is applied across catalytic cathode 12 and catalytic anode 11 from battery 16 to concentrate the gas (oxygen) which collects in anode chamber 22 and is removed through outlet 25. When the gas (air or impure oxygen) is furnished through the cathode, water either from a wicking device, from steam, or from some other source of humidification, or through back diffusion through the ion exchange membrane is furnished to the cathode. With a cation exchange membrane employed between the anode and the cathode, hydrogen ions are conducted through the membrane from the oxygen output side to the oxygen input side. Water, which is formed at the oxygen input side, migrates through the electrolyte from the oxygen output side to the oxygen input side with the hydrogen ion. Since water does not back diffuse rapidly enough from the oxygen input side to the oxgyen output side to replenish water at the catalytic anode, additional water is required because water is either dissociated or migrates with hydrogen ions. This is most easily accomplished by supplying water to the gas (oxygen) output side by flooding the anode chamber or through use of wicking means. The reactions for the gas (oxygen) concentration at the various electrodes are as follows:

at the cathode;

$$\tfrac{1}{2}O_2 + 2H^+ \rightarrow H_2O$$

at the anode;

$$H_2O \rightarrow \tfrac{1}{2}O_2 + 2H^+ + 2e^-$$

Although an anion exchange membrane may be utilized as the solid polymer electrolyte for oxygen concentration, there is an advantage in utilizing a cation exchange membrane for the solid polymer electrolyte in that carbon dioxide pick-up from the air is minimized.

It has been found that an improved gas generation apparatus and an improved process for generating gas from a medium which evolves oxygen and protons by electrolysis, for example, from water, is possible by utilizing an improved catalytic anode which provides superior performance and superior stability in oxygen concentration and in the generation of oxygen and hydrogen by electrolysis. It has been found that catalysts consisting of at least two platinum group metal-containing compounds and at least one valve metal-containing compound result in improved performance in that the voltage required in the operation of the electrolysis cell may be less thereby reducing power consumption during usage, and in improved stability in that the catalytic anode made in accordance with the present invention increases the life of the electrolysis cell also thereby resulting in increased economy. Furthermore, the use of less-costly platinum group metal-containing compounds in conjunction with a less-costly valve metal containing compound results in a lower initial cost for the electrolysis cell.

As explained above, it has been discovered that the improved catalytic anode having a catalyst consisting of at least two platinum group metal-containing compounds and at least one valve metal-containing compound may be used in electrolysis cells for the concentration of oxygen from air or certain other oxygen-containing gases or for the preparation of oxygen by the electrolysis of a medium which evolves oxygen and protons (hydrogen). Thus, oxygen and hydrogen can be obtained from water, aqueous sulfuric acid, aqueous sodium sulfate and the like. The medium which evolves oxygen and protons also includes deuterium oxide and tritium oxide. For example, if water is supplied to one or both of the electrodes of the electrolysis cell, dissociation, that is, electrolysis of the water, can take place, and oxygen and hydrogen are produced at the two electrodes. Hydrogen ion is selectively transported across the ion exchange membrane. When the apparatus operates in the gas concentration mode, such as the concentration of oxygen, for example, the driving force of the applied potential as well as the permselective nature of the ion exchange membrane (solid polymer electrolyte) permits an oxidant such as air or impure oxygen to be fed to the cathode of the apparatus. Hydrogen ion is formed at one of the catalytic electrodes (the anode) and passes through the solid polymer electrolyte membrane to the opposite electrode (the cathode) where water is formed.

A variety of ion exchange membranes may be used in the cell. One which functions very adequately is a perfluorocarbon sulfonic acid solid polymer electrolyte sold by E. I. Dupont de Nemours & Co. under its trade designation NAFION. Various catalytic materials such as platinum black, for example, may be utilized for the catalytic cathode. The catalytic electrodes, both cathode and anode, are customarily pressed into, embedded upon or mounted directly upon the surface of the ion exchange membrane otherwise designated in the prior art as the solid polymer electrolyte. The catalytic cathode and the solid polymer electrolyte membrane can be chosen by one skilled in the art and are not critical in the practice of the present invention. Various catalytic cathode materials, alternative ion exchange membrane materials, their properties and mode of preparation and the like, are described in the prior art including U.S. Pat. No. 3,297,484. The catalytic electrodes are generally of the thin, porous, gas permeable type which are bonded to and embedded in opposite surfaces of the membrane so that the gases are generated right at the electrode-membrane interface.

In its broadest aspect, the improvement of the present invention is directed to the catalytic anode or catalytic oxygen-evolving anode or catalytic oxygen concentrating anode wherein the improvement comprises a catalyst consisting of at least two platinum group metal-containing compounds and at least one valve metal-containing compound. In the most preferred embodiment, the improved anode comprises a ternary catalyst consisting of two platinum group metal-containing compounds and a valve metal-containing compound. By use of the phrase "platinum group metal-containing compound" as used herein, is meant a reduced platinum group metal oxide, a reduced platinum group metal oxide in combination with a platinum group metal, a reduced platinum group metal oxide in combination with a platinum group metal oxide, or a reduced platinum group metal oxide in combination with platinum group metals and platinum group metal oxides, and mixtures thereof. The phrase also embraces alloys of the foregoing and alloys containing platinum group metals. Examples of using platinum group metals are platinum, palladium, rhodium, ruthenium, osmium and iridium. Although the catalytic anodes of the present invention generally embrace the platinum group metals and metal oxides, the preferred catalytic anodes are made from the reduced metal oxides, such as reduced ruthenium oxide, reduced iridium oxide, reduced platinum oxide, reduced palladium oxide, reduced rhodium oxide and reduced osmium oxide.

In accordance with the present invention, it has been found that at least two platinum group metal-containing compounds must be present in the improved catalytic anode. Mixtures or alloys of the platinum group metal-containing compounds have been found to be more stable, and any combination of the platinum group metal-containing compounds may be used in mixtures or alloys which make up the composition of the catalytic anode. For example, the catalytic anode may comprise a reduced platinum group metal oxide and a platinum metal; it may comprise a platinum group metal oxide and a reduced platinum group metal oxide; it may comprise a platinum group metal, a platinum group metal oxide and a reduced platinum group metal oxide; it may comprise two or more reduced platinum group metal oxides with two or more platinum group metal oxides and the like.

The improved catalytic anode must also comprise at least one valve metal-containing compound. As used herein, valve metal-containing compound is defined as a valve metal oxide, a reduced valve metal oxide, valve metal and mixtures thereof. The term also embraces alloys of the foregoing valve metals and alloys containing valve metals. The valve metals include titanium, tantalum, niobium, zirconium, hafnium, vanadium, and tungsten. In the preferred embodimemts of the present invention one or more reduced oxides of the valve metals such as the reduced oxide of titanium, the reduced oxide or tantalum, the reduced oxide of niobium, the reduced oxide of zirconium, the reduced oxide of hafnium, the reduced oxide of vanadium, and the reduced oxide of tungsten, may be used to stabilize the catalytic anode against attack by acid, i.e., when protons are present in the medium being electrolyzed, the medium is acidic and generally such acidic media attack the electrode and reduce the life of the electrode. It has been found that the electrodes made in accordance with the present invention and containing at least one valve-metal containing compound and at least two platinum group-metal containing compounds substantially extend the life of the catalytic anode. The improved catalytic anodes of the invention may also contain various mixtures and alloys of the valve metal-containing compounds. For example, the improved catalytic anodes may comprise one or more reduced oxides of a valve metal, one or more oxides of a valve metal or one or more valve metals or any mixture of the foregoing. For example, the improved catalytic anode may comprise (along with at least two platinum group metal-containing compounds as described above) a reduced oxide of titanium and tantalum metal, or an oxide of hafnium and a reduced oxide of niobium or titanium metal and tantalum metal or any combination in the form of mixtures and/or alloys of the valve metal-containing compounds as defined above.

Examples of preferred improved catalytic anodes of the invention are ternary alloys of 50% platinum-25% ruthenium-25% titanium, 50% platinum-25% ruthenium-25% hafnium, 50% ruthenium-25% iridium-25% titanium, 50% ruthenium-25% iridium-25% hafnium, 50% ruthenium-25% iridium-25% niobium, 50% ruthenium-25% iridium-25% tungsten, 50% ruthenium-25% iridium-25% tantalum, and 50% ruthenium-25% iridium-25% zirconium. The foregoing preferred ternary alloys are the reduced metal oxides.

The amount or concentration of each of the platinum group metal-containing compounds and the valve metal-containing compounds in the mixture or alloy composition of the catalytic anode is not critical as long as the alloy contains at least two platinum group metal-containing compounds and at least one valve metal-containing compound. Generally, the at least two platinum group metal-containing compounds comprise at least 50% by weight of the alloy or mixtures of the metal-containing compounds. Up to 50% by weight of the valve metal-containing compound is useful with the preferred amount of valve metal-containing compound being about 0.5%–50%, and the most preferred amount of the valve metal-containing material being about 25%–50% by weight. Thus, when the concentration of the valve metal-containing compound is 0.5% by weight, the composition of platinum group metal-containing compounds comprises 99.5% of at least two platinum group metal containing compounds.

The platinum group metal-containing compounds of the catalyst composition for the catalytic anode may be present in equal amounts or may be present in any suitable combination. For example, about 99.5% of the platinum group metal-containing compounds may be a first platinum group metal-containing compound, and the second platinum group metal-containing compound, may be 0.5% by weight. In preferred embodiments, the second platinum group metal-containing compound of the composition is about one-half the amount of the first platinum group metal-containing compound in the composition. Of the entire composition including the platinum group metal-containing compounds and the valve metal-containing compounds, the second platinum group metal-containing compound generally contains up to about 25% by weight of the composition and preferably from about 5 to about 25% by weight of the composition. Unless otherwise indicated, all percentages are weight percent.

Other materials may also be included in the catalyst composition of the improved catalytic anode as long as the materials do not affect the performance or the stability of the electrode in the processes and apparatus of the invention. For example, various binders and extenders which are well-known in the art may be used in the catalytic anode. Extenders are generally materials having good conductivity and may contribute to the stability, life, porosity, conductivity and the like of the catalyst material. One such conductive extender has been found to be graphite and may be used in an amount up to 30% by weight of the composition. In other cases, it has been found advantageous to use a binder to bond the catalyst materials, that is the alloys or mixtures, such as the ternary alloy, to the solid polymer electrolyte membrane. Binders are well-known in the art and include polytetrafluoroethylene particles which may be mixed with a mixture or alloy of the at least two platinum group metal-containing compounds and the at least one valve metal-containing compound prior to fixing the material to the solid polymer electrolyte membrane or prior to casting the catalytic electrode, whichever technique is used for mounting the electrode to the solid polymer electrolyte membrane.

The mixtures and alloys of the present invention may be made in any manner well-known in the art. In one preferred method known as the Adam's method, the catalytic alloy can be prepared by thermally decomposing the mixed metal salts of the compounds used in the alloy in the presence of a strong oxidant such as sodium nitrate (NaNO$_3$), followed by subsequent electrochemical reduction. For example, by the Adam's method as described in U.S. Pat. No. 4,039,409, the chloride salts of ruthenium, iridium and tantalum are mixed with an excess sodium nitrate. Ruthenium chloride, iridium chloride and tantalum chloride in finely-divided form are mixed in the same weight ratio as desired in the final alloy with the excess sodium nitrate, and the mixture is fused in a silica dish at about 500° C. for 3 hours. The residue is then washed thoroughly to remove any water-soluble salts such as soluble nitrates and chlorides leaving a residue of the ruthenium oxide-iridium oxide, tantalum oxide. The resulting suspension of mixed oxides is reduced by an electrochemical reduction technique, and the product is a reduced ruthenium-iridium-tantalum alloy. The alloy may be dried thoroughly, comminuted and then graded as desired, for example, by use of sieves such as 400 mesh nylon screen. Stabilization is then affected by temperature (thermal) stabilization, i.e., by heating the platinum group metal-containing compound at a temperature below that at which it begins to decompose, and preferably, by heating the reduced oxides of the platinum group metal at a temperature at which the reduced oxides begin to decompose. Thus, the reduced oxides of the platinum group metals may be heated at about 350°–750° C. from 30 minutes to 6 hours. The preferred thermal stabilization procedure is accomplished by heating the reduced oxides for 1 hour at temperatures in the range of 550° to 600° C. The materials are further stabilized by mixing them with other reduced oxides of other platinum group metals and also with the reduced oxides of the valve metals. In one mode of the present invention, it has been found that the ternary alloys of reduced oxides of the platinum group metals are very effective in producing stable, long-lived anodes in the oxygen gas generation processes and apparatus of the present invention. In the case of the ternary alloy, the composition is preferably 5% to about 25% by weight of reduced oxides of one platinum group metal-containing compound, approximately 50% by weight of another reduced oxide of a platinum group metal-containing compound and the remainder a valve metal-containing compound. The catalyst compositions made in accordance with the present invention for use in the oxygen generating or concentration apparatus may be sieved through the appropriate size mesh screen where desired.

Anode and cathode current collectors well-known in the art may also be used to engage the catalytic anode and the catalytic cathode respectively to make electrical contact therewith.

EXAMPLE 1

To illustrate the operational characteristics of an electrolysis cell utilizing the improved catalytic anodes of the invention and to show the superior performance of the oxygen generating processes and apparatus of the present invention, electrolysis cells similar to those in FIG. 1 were constructed and various oxygen evolving anodes were used therein. The catalyst cathode of each of the electrolysis cells contained a platinum catalyst, such as platinum black. The solid polymer electrolyte membrane was a cation exchange membrane having electrodes with active areas of approximately 1/20 ft$^2$ operating in a flooded anode mode. The cells were operated at 150° F. The performance of several of the electrolysis cells were compared when the improved catalytic anodes having at least two platinum group metal-containing compounds and at least one valve metal-containing compound, and more specifically containing a ternary alloy, were compared with prior art catalytic anodes having reduced platinum group metal oxides. In one case a 50% platinum-50% iridium (reduced metal oxide) was used as the anode catalyst, and in another case the prior art reduced oxide of 80% platinum-20% ruthenium was used as the anode catalyst material. The performance designated as cell potential in volts for various current densities in amperes per square foot are set forth in Table 1 for the various alloys and mixtures shown in the table.

TABLE 1

PERFORMANCE COMPARISON OF ELECTROLYSIS CELLS USING BINARY AND TERNARY ALLOY CATALYST ANODES
CELL POTENTIAL (VOLTS)

| Current Density (amps/ft$^2$) | *Pt(50)/Ir(50) Anode Catalyst | *Pt(80)/Ru(20) Anode Catalyst | *Pt(50)/Ru(25)/Hf(25) Anode Catalyst | *Pt(50)/Ru(25)/Ta(25) Anode Catalyst |
|---|---|---|---|---|
| 100 | 1.53 | 1.51 | 1.50 | 1.54 |
| 200 | 1.59 | 1.57 | 1.57 | 1.59 |
| 300 | 1.63 | 1.62 | 1.62 | 1.64 |

*Designates percentage of reduced metal oxide alloy in anode catalyst.

The cell was operated at about 66° C. It can be seen from the data in Table 1 that the results achieved with the electrolysis cell containing a 50% platinum/25% ruthenium/25% hafnium ternary catalyst anode demonstrates the feasibility of lower cost, high performance catalysts of the present invention for electrolysis. In certain instances, the cell voltage using the less expensive ternary catalyst of the present invention is better than the voltage in those cells using the prior art binary (two metal-containing) catalysts. For example, the improved anode catatlyst of the invention made from the reduced oxides of 50% platinum/25% ruthenium/25% hafnium show improved performance (less cell voltage or reduced cell voltage) at a current density of 100 amps/ft.$^2$ and 300 amps/ft.$^2$.

EXAMPLE 2

Several reduced metal oxides containing ruthenium and iridium platinum group metals were formed into alloys and/or mixtures with the valve metals. The modified Adams method discussed above was used to prepare the ternary alloys and/or mixtures from the mixed halides or nitrate salts of the various metals fused with sodium nitrate to form the oxides. These oxides were then electrochemically reduced, and the resulting materials (alloy and/or mixtures) were formed into electrodes and placed upon the surface of a solid polymer electrolyte membrane identified as NAFION and disclosed in detail above. A reduced platinum black catalyst was used as the cathode material. The hydrated membrane having the defined catalytic anode and cathode was placed in an electrolysis cell similar to that shown in FIG. 1 and described in the specification. The performance of the cell at about 82° C. (180° F.) is shown in Table 2 below where several ternary catalyst anodes of the present invention containing the platinum group metals, ruthenium and iridium, and various valve metals, are compared with a prior art platinum/iridium catalyst anode.

TABLE 2

PERFORMANCE COMPARISON OF ELECTROLYSIS CELLS USING BINARY AND TERNARY ALLOY CATALYST ANODES
CELL POTENTIAL (VOLTS)

| Current Density (amps/ft$^2$) | *Pt(50)/Ir(50) Anode Catalyst | *Ru(50)/Ir(25)/Ta(25) Anode Catalyst | *Ru(50)/Ir(25)/Zr(25) Anode Catalyst |
|---|---|---|---|
| 100 | 1.475 | 1.438 | 1.447 |
| 500 | 1.649 | 1.609 | 1.617 |
| 1000 | 1.805 | 1.772 | 1.774 |
| 1500 | 1.941 | 1.914 | 1.906 |

*Designates percentage of reduced metal oxide alloy in anode catalyst.

EXAMPLE 3

Valve metal-containing ruthenium/iridium catalysts were made in accordance with the procedure set forth in Example 2, and solid polymer electrolyte membranes using the described ternary catalysts as anodes and platinum black as cathodes were used in electrolysis cells identical to those described in Example 2. The test cells were run at about 82° C. (180° F.). Electrolysis cell voltage at various current densities for these electrolysis cells using the improved electrode (anodes) of the invention are shown in Table 3 below. The cell voltages may be compared with the prior art 50% platinum/50% iridium reduced oxide anode catalyst shown in Table 2.

TABLE 3

CELL POTENTIALS AT VARIOUS CURRENT DENSITIES OF ELECTROLYSIS CELLS USING TERNARY ALLOY CATALYST ANODES
CELL POTENTIAL (d.c. VOLTS)

| Current Desity (amps/ft$^2$) | *Ru(50)/Ir(25)/Ti(25) ANODE CATALYST | *Ru(50)/Ir(25)/Hf(25) ANODE CATALYST | *Ru(50)/Ir(25)/Nb(25) ANODE CATALYST | *Ru(50)/Ir(25)/W(25) ANODE CATALYST |
|---|---|---|---|---|
| 100 | 1.494 | 1.447 | 1.471 | 1.449 |
| 500 | 1.666 | 1.627 | 1.650 | 1.613 |
| 1000 | 1.825 | 1.780 | 1.812 | 1.758 |
| 1500 | 1.956 | 1.860 | 1.945 | 1.892 |

*Designates percentage of reduced metal oxide alloy in anode catalyst.

The foregoing data demonstrates that less expensive oxygen generating anodes can be prepared and operated in electrolysis cells as efficiently and in many cases more efficiently than the prior art catalytic oxygen evolving anodes. Power reduction, that is, reduced cell voltages, is significant, and if the reduction in cell potential is even as little as 50 millivolts, substantial savings in power consumption can be realized. The foregoing data demonstrates efficient oxygen evolution with the improved ternary catalyst anode of the invention.

While other modifications of the invention and variations thereof which may be employed within the scope of the invention have not been described, the invention is intended to include such modifications as may be embraced within the following claims. What is claimed is:

1. Apparatus for the evolution of oxygen and protons by electrolysis of an oxygen containing compound whereby gaseous oxygen and gaseous hydrogen are produced in said apparatus comprising:

a catalytic cathode;

a catalytic oxygen evolving anode comprising a ternary catalyst of a first platinum group metal compound, a second platinum group metal compound and a valve metal containing compound, wherein said valve metal containing compound comprises about ½ percent to about 50 percent by weight, the first platinum containing compound comprises about 5 percent to about 25 percent by weight, and the second platinum group metal compound comprises the remainder of said ternary catalyst;

an ion exchange membrane for dividing the apparatus into anode and cathode chambers, said membrane being disposed between and in electrical contact with the catalytic cathode and catalytic oxygen evolving anode, the cathode and anode being bonded to the membrane;

means for providing a direct current potential to said anode whereby an anodic potential is applied to the anode containing the oxygen evolving ternary catalyst;

means for continuously introducing an oxygen evolving compound to the anode chamber to evolve gaseous oxygen and protons in an electrolysis reaction, and means for providing a direct current potential to the cathode whereby a cathodic potential is applied to the cathode thereby causing transport of said protons across said membrane to evolve gaseous hydrogen at the cathode.

2. The apparatus of claim 1 wherein the catalyst of the oxygen evolving anode comprises about 50 percent by weight ruthenium, about 25 percent by weight iridium, and about 25 percent by weight of tantalum.

* * * * *